United States Patent [19]
Kinney

[11] Patent Number: 5,913,646
[45] Date of Patent: Jun. 22, 1999

[54] TABLE EXTENSIONS FOR USE WITH A MILLING MACHINE

[75] Inventor: Michael K. Kinney, Waxahachie, Tex.

[73] Assignee: Precast Solutions, Inc., Desoto, Tex.

[21] Appl. No.: 09/086,967

[22] Filed: May 29, 1998

[51] Int. Cl.$^6$ ...................................................... B23D 7/08
[52] U.S. Cl. ........................ 409/219; 409/137; 409/159; 409/235
[58] Field of Search .................................. 409/137, 145, 409/219, 235, 159, 163, 227

[56] References Cited

U.S. PATENT DOCUMENTS

| | | |
|---|---|---|
| 1,511,141 | 10/1924 | Scott et al. . |
| 2,426,095 | 8/1947 | Hecker . |
| 2,913,022 | 11/1959 | Siemantel . |
| 3,008,500 | 11/1961 | Siemantel . |
| 3,124,018 | 3/1964 | Gough ..................................... 409/219 |
| 4,403,389 | 9/1983 | Coope ..................................... 409/219 |
| 4,621,407 | 11/1986 | Suzuki ..................................... 409/235 |
| 4,949,942 | 8/1990 | Shoda . |
| 4,971,488 | 11/1990 | Mihara et al. . |
| 5,286,148 | 2/1994 | Cayley, Jr. . |
| 5,429,461 | 7/1995 | Mukherjee et al. ..................... 409/163 |
| 5,468,101 | 11/1995 | Shoda ..................................... 409/145 |
| 5,569,004 | 10/1996 | Marantette ............................... 409/235 |
| 5,575,318 | 11/1996 | Susnjara .................................. 409/235 |

*Primary Examiner*—Daniel W. Howell
*Assistant Examiner*—Adesh Bhargava
*Attorney, Agent, or Firm*—H. Dennis Kelly; Jeffrey T. Hubbard; Timmons & Kelly

[57] ABSTRACT

Table extensions for use with a numerically controlled (CNC) milling machine are disclosed. A gauge table extension has a platform, and means for feeding a workpiece along the platform into the milling machine. A number of support means hold up the platform and feeding means. Lower guide rails attached to each of the support means and upper guide rails attached to the platform transverse to the lower guide rails connect to the lower guide rails through a number of dual-axis bearings that allow the platform to be translated with respect to the support means. A catch tray catches filings and coolant that result from the machining process and recycles the coolant to the CNC milling machine.

6 Claims, 3 Drawing Sheets

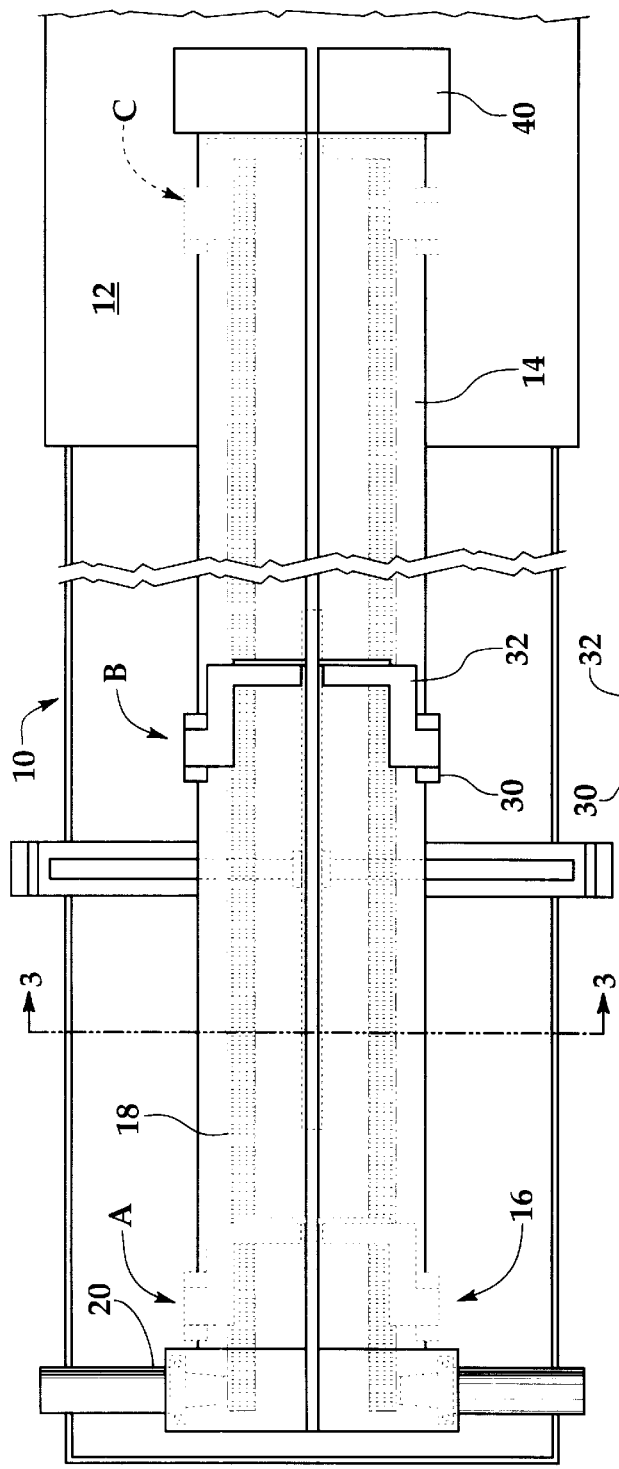
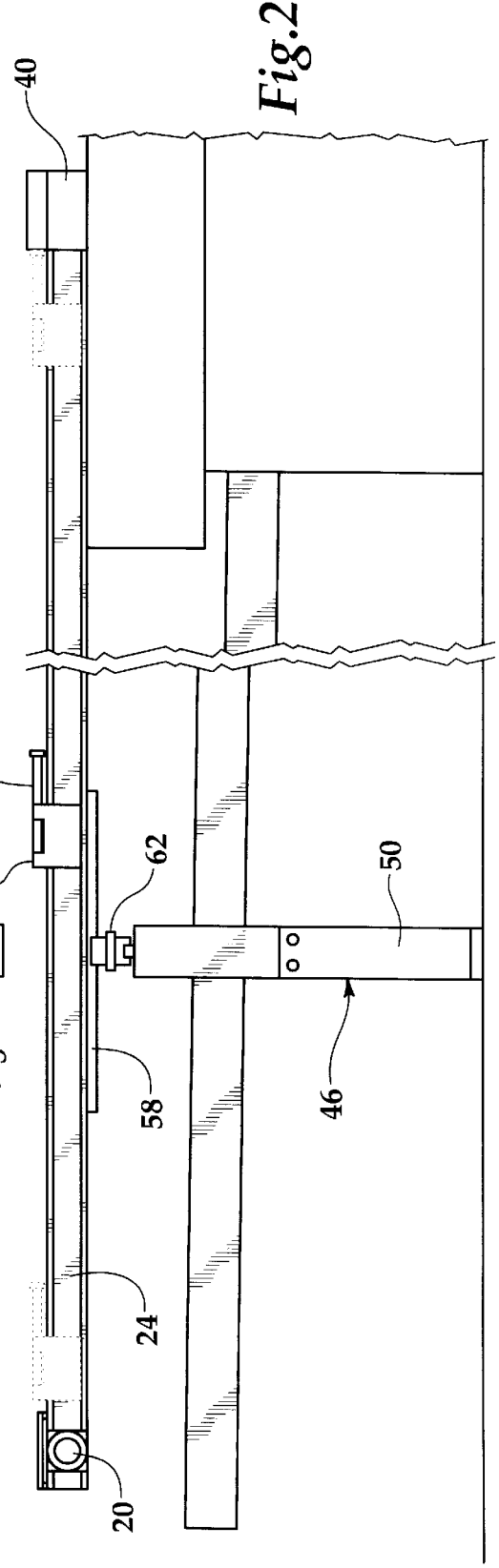

TABLE EXTENSIONS FOR USE WITH A MILLING MACHINE

BACKGROUND OF THE INVENTION

1. Field of the Invention

This invention relates in general to industrial manufacturing machinery. In particular, the invention relates to gauge table and runout table extensions for use with a computerized numerically controlled (hereafter CNC) milling machine for machining long workpieces such as door frame members.

2. Description of the Related Art

CNC milling machines have become indispensable for machining. Certain milling machines are designed with a moving support surface on which to rest a workpiece. Some of these milling machines are designed to handle a workpiece having a major dimension of about one meter. For larger pieces, one or more extensions can be added to the support surface of the milling machine to provide adequate support for the workpiece. Since the milling machine support surface moves, the extensions should move along with the support surface to prevent shifting of the workpiece. While numerous extensions have been devised, none of the existing structures adequately handles long narrow workpieces, such as door frame members that can be four meters long or greater when designed for large doorways. Present types of table extensions designed for workpieces of this length are generally complicated and expensive. An extension that is less expensive to construct and operate is desired.

The general object of the invention is to support a long, narrow workpiece during machining. A simultaneous object is that the invention secure the workpiece from slipping or shifting during machining, while simultaneously allowing the workpiece to be moved by the machining apparatus. Another object is to catch and recycle a coolant applied to the workpiece during machining. A final object is that the invention be inexpensive to construct and maintain.

SUMMARY OF THE INVENTION

In general, these objects are achieved by extensions that include platforms adapted to attach to the support surface of a CNC milling machine. On one side of the milling machine, a belt-driven feeder is attached to a platform, with a slide attached to the belt. A ball-screw drive or another drive capable of handling the required total travel can be used in place of the belt drive. The slide attaches to a saddle that in turn engages a workpiece and feeds it into the milling machine between machining sessions. A clamp secures the workpiece to the platform and the milling machine support surface during a particular machining session, then releases the workpiece to allow the feeder to introduce a different part of the workpiece into the working space of the milling machine.

A number of supports are spaced along the length of the platform, and are continuously adjustable in height, allowing the slope of the platform to be adjusted. A lower guide rail is attached to a cross beam on each support. A corresponding upper guide rail is attached to an extension below the platform along its length, at right angles to the upper guide rail. A dual-axis bearing interconnects the corresponding upper guide rail/lower guide rail pairs, so that the supports uphold the platform. In addition, the dual-axis bearing allows the platform to be moved relative to the supports with minimal chance for shifting of the workpiece on the platform.

A catch tray is attached to the supports below the lower guard rails, and catches coolant dispensed by the milling machine and recycles the coolant back to the milling machine.

The above objects, as well as additional objects, features, and advantages of the invention will become apparent in the following detailed description and in the drawings.

BRIEF DESCRIPTION OF THE DRAWINGS

FIG. 1 is an overhead plan view of a gauge table according to the invention, depicting part of the feeding means in phantom, and shown connected to a numerically-controlled milling machine located on the right side of the figure.

FIG. 2 is a front elevation thereof.

DESCRIPTION OF THE PREFERRED EMBODIMENT

Figure 3:
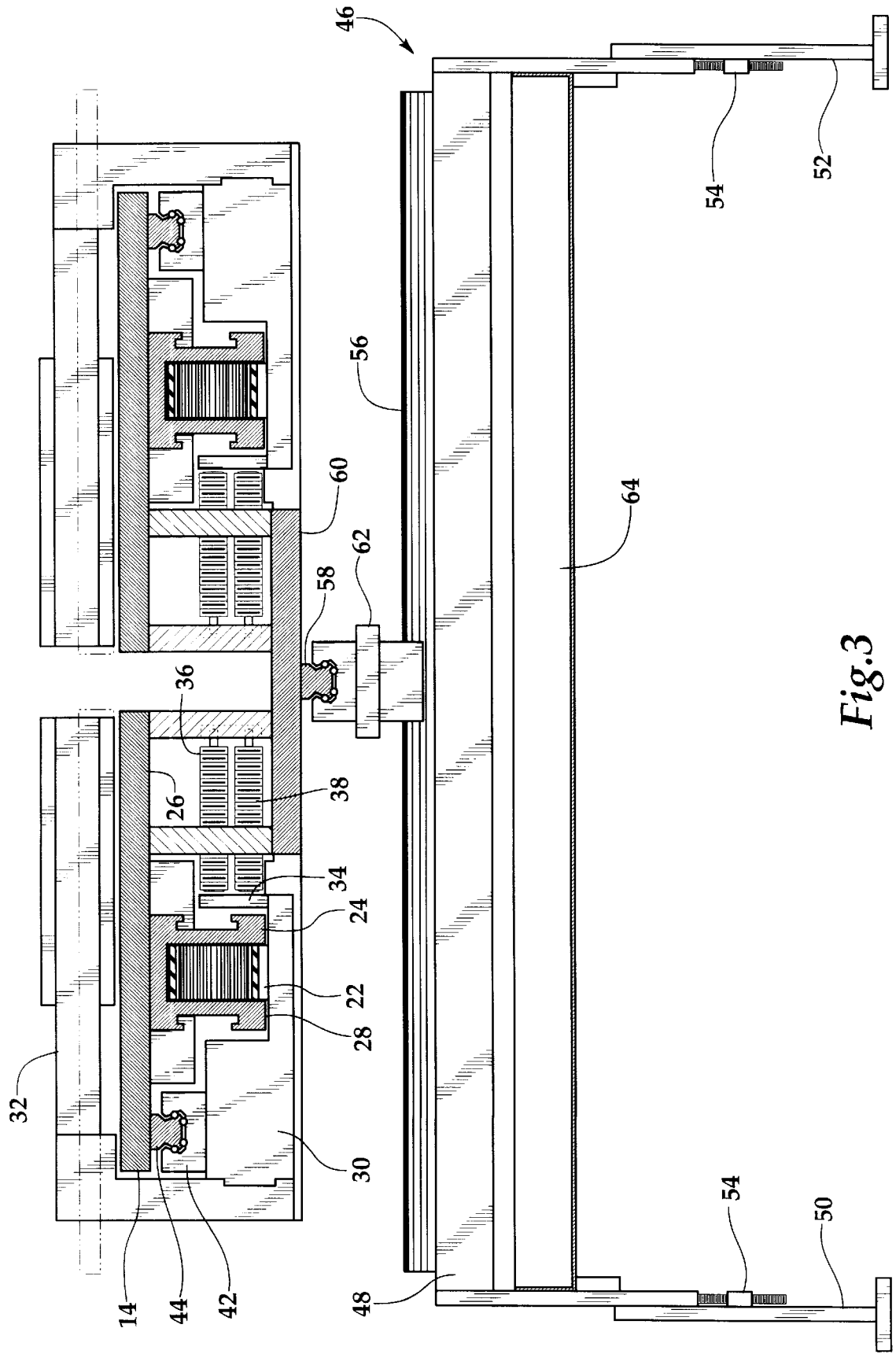
FIG. 3 is a left side cross-sectional view thereof, taken along lines 3—3 in FIG. 1.

FIGS. 1–3 show the preferred embodiment of the gauge table portion 10 of a milling machine table extension according to the invention. The gauge table 10 is designed to interlock with CNC machines that employ a movable support surface 12 having a key slot for attaching extensions to the table, such as the Bridgeport Model Torq-Cut 30, manufactured by Bridgeport Machines, Inc. located in Bridgeport, Conn.

The gauge table 10 has a platform 14 and a belt-driven feeder 16 for feeding a workpiece onto the milling machine support surface 12. Both the platform 14 and the feeder 16 are made up of two halves that are essentially mirror-images of each other. Only one of the halves will be discussed for convenience, but the discussion applies to both halves unless otherwise indicated.

The feeder 16 is made up of a toothed belt 18 driven by a motor and pulley combination 20. The belt 18 is made from a length of material cut to the proper length, with the ends fastened together with a clamp 22 by nuts and bolts. The belt 16 runs inside a guide 24 attached to the bottom side 26 of the platform 14. A slot 28 runs the length of the guide 24 on the side distal to and beneath the platform 14. The clamp 22 passes through the slot 28 and attaches to a slide 30 that wraps around the platform 14. A saddle 32 attaches to the slide and is adapted to engage a workpiece (not shown).

A tang 34 attached to the slide 30 is adapted to activate one of a pair of proximity switches 36 and 38 when the saddle 32 comes within about one-half inch (12 mm) of either the motor/pulley assembly 20 at one end of the platform 14 (indicated by position A in FIG. 1) or a vise clamp 40 at the other end of the platform 14 (indicated by position C in FIG. 1). The proximity switches 36 and 38 prevent overtravel by the slide 30 and saddle 32 that could cause equipment damage. The proximity switches 36 and 38 only need to be provided for one of the two feeder halves, but can be supplied for both halves of the feeder 16 if desired.

A slide bearing block 42 attached to the slide 30 runs along a slide rail 44 attached to the underside of the platform 14. The combination acts to keep the slide 30 and saddle 32 aligned with the platform 14 and keeps the slide 30 and saddle 32 supported just off the upper surface of the platform 14. The preferred type of bearing employs a ball bearing race designed to run along a linear track. A type SR-W block bearing, manufactured by THK, was used in a prototype.

The hydraulically actuated vise clamp 40 holds the workpiece against the platform 14 and the milling machine support surface 12 at specific periods during machining. The clamp 40 is actuated from a signal in a logic system (not shown) that interfaces with the control system for the CNC milling machine. In a typical cycle, the clamp 40 is directed to clamp the workpiece, then a number of features are machined in one area of the workpiece. The clamp 40 is then directed to release the workpiece, the feeder 16 feeds the workpiece a preselected distance, and the cycle repeats.

A belt drive is used for the feeder 16 because belt drives are less expensive for handling the necessary total amount of travel. However, a different type of drive such as a ball-screw drive can be used. Also, while the present embodiment is designed only to feed the workpiece toward the milling machine, simple modification could allow the invention to move the workpiece in either direction along the length of the platform 14.

While the belt drive is normally considered to lack the necessary precision for accurate positioning, a prototype maintained an accuracy of slightly better than ± one millimeter over a range of operation of about four meters, when the drive was regularly maintained and calibrated. An accuracy of ±2 millimeters should be achievable under ordinary use. Accuracy between individual machining features for a particular cycle (that is, while the clamp 40 secures the workpiece against the platform 14) is determined by the precision of the CNC milling machine rather than the precision of the feeder 16.

Turning now to FIGS. 2 and 3, a number of pedestals 46 provide support for the platform 14 and feeder 16. The pedestals are placed at intervals along the length of the platform 14, the number and spacing of the pedestals depending on the length of the platform 14 and the weight load presented by the gauge table and workpiece. Each pedestal 46 has a cross beam 48, attached to identical legs 50 and 52 by threaded couplings 54 that allow continuous adjustment of the height of the platform 14.

A novel structure provides means for supporting the platform 14 (which is hereafter intended to encompass the entire platform 14 rather than one of the two halves), while allowing it to translate in two axes along with the milling machine support surface 12. As shown in FIG. 3, a lower guide rail 56 connects to the upper surface of each of the pedestal cross beams 48. A corresponding upper guide rail 58, oriented along the major axis of the platform 14, is attached to the platform through an offset 60. The offset 60 raises the feeder 16 above the level of the lower guide rails 56 so that the pedestals 46 will not interfere with movement of the platform 14 and the feeder 16. A dual-axis bearing 62 slideably interconnects a lower guide rail 56 to the corresponding upper guide rail 58. The dual-axis bearing 62 consists of two block bearings similar to the slide bearing block 42 set back-to-back in a single unit, with the two bearing races set at right angles. It is noted that the lengths of each lower guide rail 56 and upper guide rail 58 is greater than the total distance that the milling machine support surface 12 can travel in the corresponding rail, so that the dual-axis bearing 62 will remain attached to the lower guide rail 56 and the upper guide rail 58 for any possible movement of the platform 14 and feeder 16. An alternative structure replaces the individual upper guide rails 58 with a single rail spanning the total length of the platform 14. With this structure, the pedestals 46 will inherently support the platform 14 at a number of collinear points. The separate upper guide rails 58 do not need to be collinear, but collinear arrangement along the centerline of the platform 14 is preferred to improve balancing of the gauge table extension 10 on the dual-axis bearings 62.

A catch tray 64 attaches to the pedestals 46 below the cross beams 48. The tray 64 is designed to catch shavings from the machining process. Also, a coolant is dispensed by the milling machine onto the workpiece during machining. In typical situations, this coolant will run down the workpiece and spill off its sides. The catch 64 tray captures and collects the coolant, and returns it to the milling machine for reuse. The catch tray 64 therefore slopes toward the milling machine.

Figure 4:
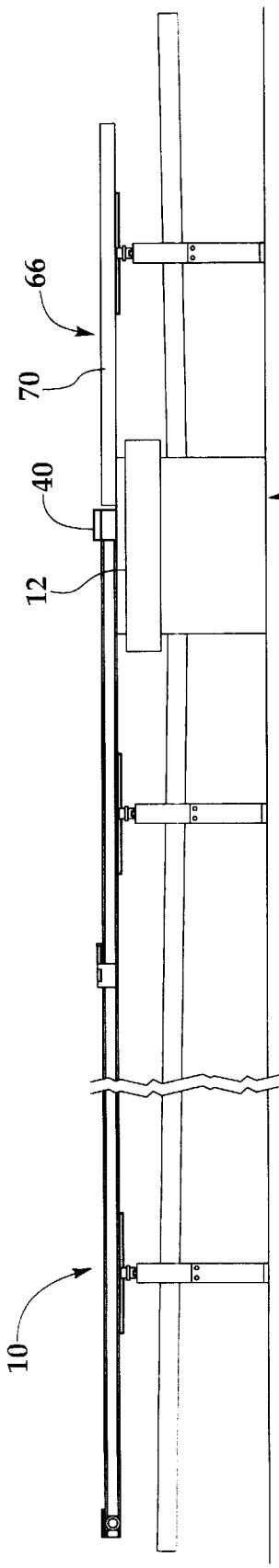
FIG. 4 is a front elevation of the gauge table and a runout table according to the invention connected on opposite sides of the milling machine.
Figure 5:
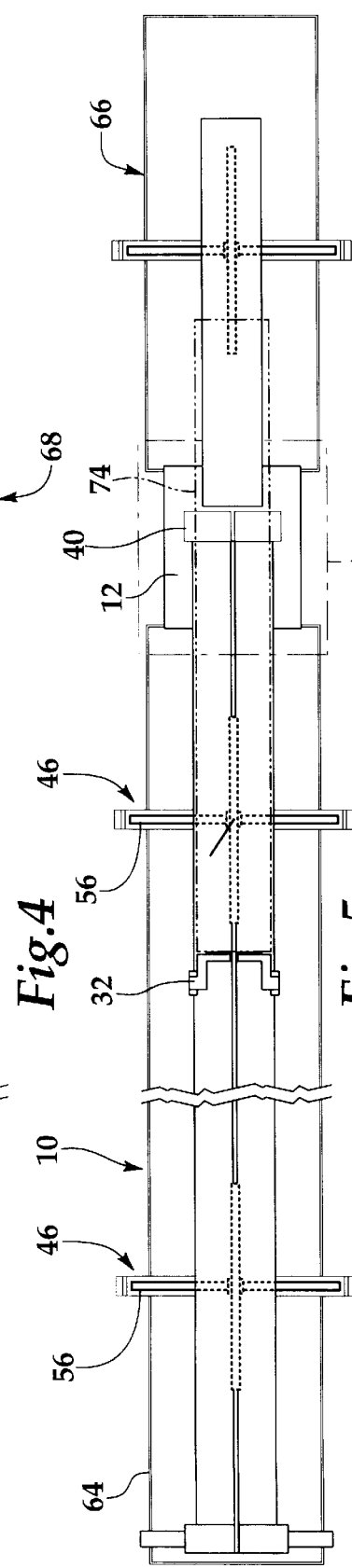
FIG. 5 is an overhead plan view thereof during the machining of a workpiece, with the workpiece positioned roughly in the center of the range of travel of the milling machine, the workpiece shown in phantom.
Figure 6:
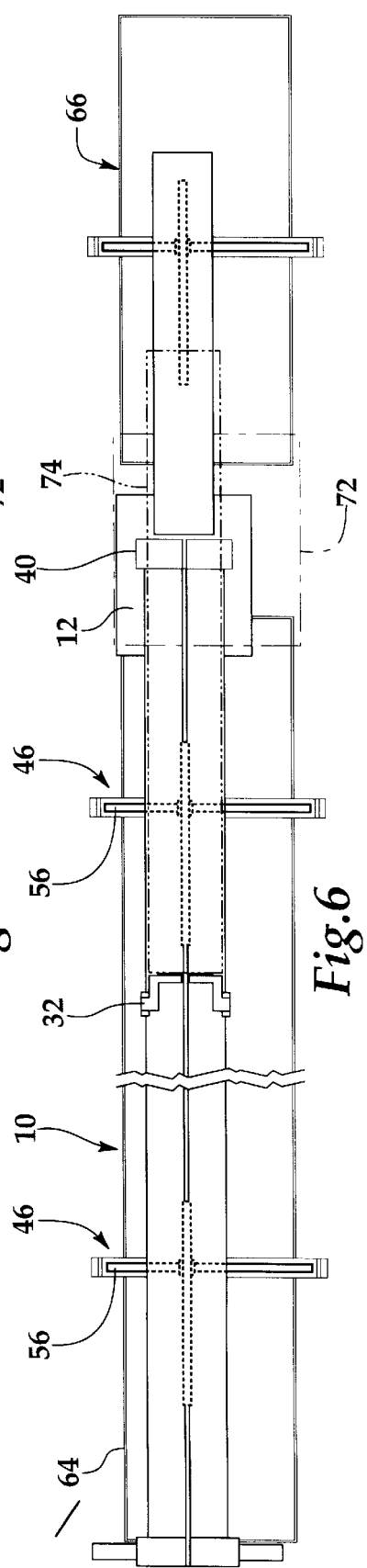
FIG. 6 is another overhead plan view thereof, after the milling machine has moved the workpiece up and left relative to the position in FIG. 5.

FIGS. 4–6 depict the complete embodiment of the invention, which includes a runout table extension 66 located on the side of the milling machine 68 opposite the gauge table extension 10. The runout table 66 has substantially the same platform, pedestals, catch tray, and translating means as the gauge tray extension 10, but omits the feeder and vise clamps. Also, the platform 70 for the runout table extension 66 is not as long as the gauge table platform 14, although the actual length can be varied for a particular application.

FIGS. 5 and 6 illustrate how the translating means support the platform 14 as it moves along with the support surface 12. The milling machine base 72 and a typical workpiece 74 are shown in phantom to allow better view of the elements of the invention. In FIG. 5, the support surface 12 is essentially centered on the base 72, while in FIG. 6. the support surface has moved to the upper left corner of it available travel range. Note that the point at which each lower guard rail 56 and the upper guard rail 58 contacts the corresponding dual-axis bearing 62 is similarly translated.

The invention has several advantages over the existing art. First, it allows the use of smaller, less expensive milling machines for machining narrow workpieces whose length would otherwise require use of a larger, more complex and costly milling machine. Its belt driven feed mechanism and simple yet rugged translating support system result in a structure that is substantially less expensive than existing designs, yet still provides The workpiece moves relative to the platform only between machining cycles, rather than when the milling machine support surface, which minimizes the chance for shifting of the workpiece due to friction between the workpiece and the platform.

The invention have been shown in only one embodiment. It should be apparent to those skilled in the art that the invention is not limited to the embodiment, but is capable of being varied and modified without departing from the scope of the invention as set out in the attached claims.

What is claimed is:

1. A table extension for use with a computerized numerically controlled milling machine, comprising:

feeding means for feeding a workpiece through the milling machine;

a planar extension platform, adapted to interlock with the milling machine, and on which the workpiece rests;

clamping means for holding the workpiece in place relative to the platform;

platform support means for supporting the platform; and translating means, connected between the platform and the platform support means, for providing support at a number of points substantially collinear along the length of the platform, and for allowing translation of the platform relative to the platform support means.

2. A table extension as recited in claim 1, further comprising a catch tray attached to the platform support means below the platform, for collecting and recycling a coolant discharged by the milling machine onto the workpiece.

3. A table extension as recited in claim 1, wherein the feeding means comprises at least one belt, a motor coupled to at least one pulley for driving the belt, a slide attached to the belt, and a saddle adapted to engage the workpiece for feeding the workpiece to the milling machine.

4. A table extension as recited in claim 1, wherein the clamping means comprises a pair of hydraulically actuated vise clamps attached to the platform.

5. A table extension as recited in claim 1, wherein the platform support means comprises a plurality of pedestals, each pedestal further comprising a pair of legs and a cross member, the cross member being connected to the legs in a manner allowing the height of the cross member to be continuously adjusted over a preselected range.

6. A table extension as recited in claim 1, wherein the translating means comprises a plurality of translation subsystems, each translation subsystem further comprising an upper guide rail connected to the platform, a lower guide rail connected to the platform support means transverse to the upper guide rail, the upper guide rail and each of the lower guide rails engaging a double-axis bearing, the double-axis bearing being capable of movement simultaneously along the upper guide rail and the lower guide rail.

* * * * *